United States Patent
Nakao

(10) Patent No.: US 9,434,243 B2
(45) Date of Patent: Sep. 6, 2016

(54) STRADDLE-TYPE ELECTRIC VEHICLE

(71) Applicant: Yamaha Hatsudoki Kabushiki Kaisha, Iwata-shi, Shizuoka (JP)

(72) Inventor: Riki Nakao, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 0 days.

(21) Appl. No.: 14/740,376

(22) Filed: Jun. 16, 2015

(65) Prior Publication Data

US 2015/0360576 A1    Dec. 17, 2015

(30) Foreign Application Priority Data

Jun. 17, 2014   (JP) ................. 2014-124799

(51) Int. Cl.
| | | |
|---|---|---|
| *B60K 1/04* | (2006.01) | |
| *B60L 11/18* | (2006.01) | |
| *H01R 13/73* | (2006.01) | |
| *B62J 23/00* | (2006.01) | |
| *B62J 27/00* | (2006.01) | |
| *B62K 11/00* | (2006.01) | |
| *B62K 11/10* | (2006.01) | |

(52) U.S. Cl.
CPC ............. *B60K 1/04* (2013.01); *B60L 11/1818* (2013.01); *B62J 23/00* (2013.01); *B62J 27/00* (2013.01); *B62K 11/00* (2013.01); *B62K 11/10* (2013.01); *H01R 13/73* (2013.01); *B62K 2202/00* (2013.01); *B62K 2204/00* (2013.01)

(58) Field of Classification Search
CPC ....................................... B60K 1/04
See application file for complete search history.

(56) References Cited

U.S. PATENT DOCUMENTS

| | | | | |
|---|---|---|---|---|
| 8,505,668 B2* | 8/2013 | Iwakami | ................. | B60K 1/04 180/211 |
| 8,662,232 B2* | 3/2014 | Nakamura | ............... | B60K 1/04 180/220 |
| 8,746,391 B2* | 6/2014 | Atsuchi | ................. | B60K 1/04 180/220 |
| 8,970,061 B2* | 3/2015 | Nakagawa | ............ | B60L 3/0046 307/10.1 |
| 8,973,697 B2* | 3/2015 | Matsuda | ................ | B62K 11/04 123/41.72 |
| 9,090,301 B2* | 7/2015 | Matsuda | ................ | B62K 11/04 |
| 2012/0103710 A1 | 5/2012 | Atsuchi et al. | | |
| 2013/0260595 A1 | 10/2013 | Tamaki et al. | | |

FOREIGN PATENT DOCUMENTS

| | | |
|---|---|---|
| CN | 2375550 Y | 4/2000 |
| CN | 201321124 Y | 10/2009 |

(Continued)

OTHER PUBLICATIONS

Official Communication issued in corresponding European Patent Application No. 15172243.6, mailed on Oct. 22, 2015.

*Primary Examiner* — Kevin Hurley
(74) *Attorney, Agent, or Firm* — Keating and Bennett, LLP

(57) ABSTRACT

A power receiving connector includes a connection port to connect a power supply connector in a first direction. A grasped portion for an operator to grasp is provided near the power receiving connector. At least a portion of the grasped portion is located in a second direction orthogonal or substantially orthogonal to the first direction from the power receiving connector when the connection port of the power receiving connector is viewed in the first direction. When the power supply connector provided in a battery charger is connected to the power receiving connector provided in a vehicle body and the power supply connector is pulled out from the power receiving connector, instability of the attitude of the vehicle body is reduced or prevented.

11 Claims, 14 Drawing Sheets

(56) References Cited

FOREIGN PATENT DOCUMENTS

| JP | 61-30425 A | 2/1986 |
| JP | 2002-331977 A | 11/2002 |
| JP | 2005-80490 A | 3/2005 |
| JP | 2012-176695 A | 9/2012 |
| JP | 2013-207829 A | 10/2013 |

* cited by examiner

STRADDLE-TYPE ELECTRIC VEHICLE

BACKGROUND OF THE INVENTION

1. Field of the Invention

The present invention relates to a straddle-type electric vehicle. In particular, it relates to a layout of a power receiving connector in a straddle-type electric vehicle driven by an electric motor.

2. Description of the Related Art

A straddle-type vehicle driven by an electric motor includes a battery that stores power supplied to the electric motor. As disclosed in JP 2013-207829 A, in some straddle-type electric vehicles, the batteries may be charged in a state where the batteries are mounted on the vehicle. Such a type of electric vehicle includes a power receiving connector for connection of a cable of an external battery charger and the battery receives power from the battery charger through the power receiving connector. A power supply connector is provided on the end of the cable of the battery charger.

In order to secure connection stability between the terminal of the power receiving connector and the terminal of the power supply connector, sufficient contact pressure is necessary between the terminals. Further, when a housing holding the terminal of the power receiving connector and a housing holding the terminal of the power supply connector are connected to each other, friction is generated between the two housings. Accordingly, when the power supply connector is inserted into the power receiving connector or pulled out from the power receiving connector, resistances (insertion and pull-out resistances) are created due to the friction between the terminals and the friction between the housings. However, the straddle-type electric vehicle has a smaller vehicle weight than that of, e.g., a four-wheel electric automobile, and thus, when the power supply connector is inserted in and pulled out from the power receiving connector against the insertion and pull-out resistances, the attitude of the vehicle body becomes unstable. For example, when the power supply connector is pushed toward the power receiving connector, the vehicle body may tilt. Further, in the vehicle of JP 2013-207829 A, the power supply connector and the power receiving connector are inserted in and pulled out from each other in the front-back direction of the vehicle body. In this vehicle, when the connector is inserted and pulled out, a stand supporting the vehicle body may rise to its retracted position and, as a result, the attitude of the vehicle body becomes unstable.

SUMMARY OF THE INVENTION

Preferred embodiments of the present invention provide a straddle-type electric vehicle that reduces or prevents instability of an attitude of a vehicle body when a power supply connector provided in a battery charger is connected to a power receiving connector provided in the vehicle body or the power supply connector is pulled out from the power receiving connector.

According to a preferred embodiment of the present invention, a straddle-type electric vehicle includes a rear wheel, an electric motor configured to drive the rear wheel, a battery configured to store and supply power to the electric motor, a power receiving connector electrically connected to the battery and including a connection port to which a power supply connector is electrically connected in a first direction, and a grasped portion configured for an operator to grasp. A portion of the grasped portion is located in a second direction orthogonal or substantially orthogonal to the first direction from the power receiving connector and located near the power receiving connector when the connection port of the power receiving connector is viewed in the first direction.

According to the straddle-type electric vehicle described above, the operator connects the power supply connector to the power receiving connector and pulls out the power supply connector from the power receiving connector while supporting the vehicle body by grasping the grasped portion and, thus, reduces or prevents instability of the attitude of the vehicle body.

According to a preferred embodiment of the present invention, the portion of the grasped portion is preferably located farther away from a vehicle body than the power receiving connector in the first direction. Thus, even when the power supply connector has a shape elongated in the first direction, the hand grasping the grasped portion is prevented from being spaced apart by a large distance from the hand grasping the power supply connector in the first direction. As a result, the operation of connecting the power supply connector to the power receiving connector and pulling out the power supply connector from the power receiving connector becomes easier.

According to a preferred embodiment of the present invention, the portion of the grasped portion is preferably located in a same position in the first direction as that of the power receiving connector. Thus, even when the power supply connector has a shape elongated in the first direction, the hand grasping the grasped portion is prevented from being spaced apart by a large distance from the hand grasping the power supply connector in the first direction. As a result, the operation of connecting the power supply connector to the power receiving connector and pulling out the power supply connector from the power receiving connector becomes easier.

According to a preferred embodiment of the present invention, the portion of the grasped portion preferably has a shape of a bar, wherein the bar extends in a direction orthogonal or substantially orthogonal to the first direction when the connection port of the power receiving connector is viewed in the first direction. Thus, the operator easily grasps the grasped portion. Here, "shape of a bar" means that a portion extends in one direction farther than in another direction. The thickness, length, and sectional shape of the bar are not particularly limited as long as it is configured to be grasped by a human hand.

According to a preferred embodiment of the present invention, the grasped portion preferably includes a first extending portion located in the second direction from the power receiving connector and a second extending portion bent with respect to the first extending portion. Thus, the degree of freedom in the manner of grasping by the operator is increased.

According to a preferred embodiment of the present invention, the power receiving connector is preferably surrounded by the grasped portion when the connection port of the power receiving connector is viewed in the first direction. Thus, the degree of freedom in the manner of grasping by the operator is increased.

According to a preferred embodiment of the present invention, the grasped portion is preferably fixed to a vehicle body frame. Thus, the grasped portion is strongly supported.

According to a preferred embodiment of the present invention, the grasped portion is preferably fixed to a front-wheel suspension supporting a front wheel. Thus, the grasped portion is strongly supported.

According to a preferred embodiment of the present invention, the portion of the grasped portion is preferably located farther leftward than the power receiving connector when the connection port of the power receiving connector is viewed in the first direction. Thus, an operation of connecting the power supply connector to the power receiving connector with the right hand while grasping the grasped portion with the left hand is easily performed.

According to a preferred embodiment of the present invention, a cap is configured to close the power receiving connector and the cap is preferably configured to maintain an open state when the cap is opened. Thus, it is unnecessary for the operator to hold the cap when charging the battery, and the charging operation is easily performed.

According to a preferred embodiment of the present invention, the connection port of the power receiving connector is preferably directed toward a front side or a rear side of the vehicle body. Thus, when the power supply connector is connected to the power receiving connector, the power supply connector does not project in a lateral direction of the vehicle body. Accordingly, the power supply connector is not a hindrance during charging of the battery.

According to a preferred embodiment of the present invention, the connection port of the power receiving connector is preferably directed outward in a vehicle width direction.

According to a preferred embodiment of the present invention, the power receiving connector and the grasped portion are preferably located above the rear wheel. Thus, the positions of the power receiving connector and the grasped portion are relatively high and the operation of connecting the power supply connector to the power receiving connector is easily performed.

According to a preferred embodiment of the present invention, the power receiving connector and the grasped portion are preferably configured to be turned to the right and to the left together with a front-wheel suspension supporting a front wheel. Thus, when charging the battery, the orientation of the power receiving connector is easily changed to a desired orientation by turning a handle connected to the front-wheel suspension to the right or to the left.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Straddle-type electric vehicles according to preferred embodiments of the present invention will be explained with reference to the drawings. In the specification, an electric motorcycle will be described as an example of the straddle-type electric vehicle. The straddle-type electric vehicle may be, for example, a straddle-type four-wheel vehicle.

Figure 1:
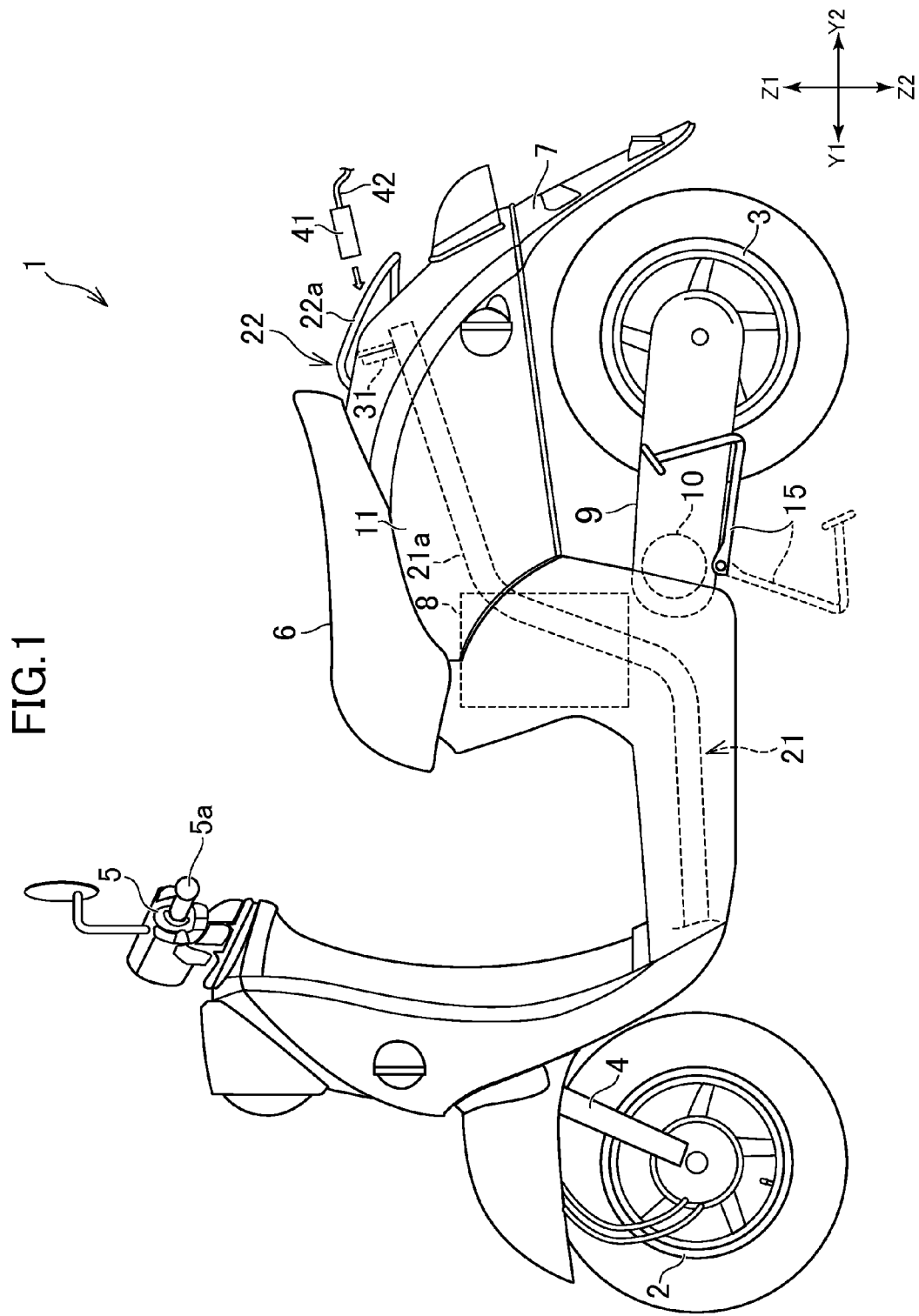
FIG. 1 is a side view of an electric motorcycle according to a first preferred embodiment of the present invention.
Figure 2:
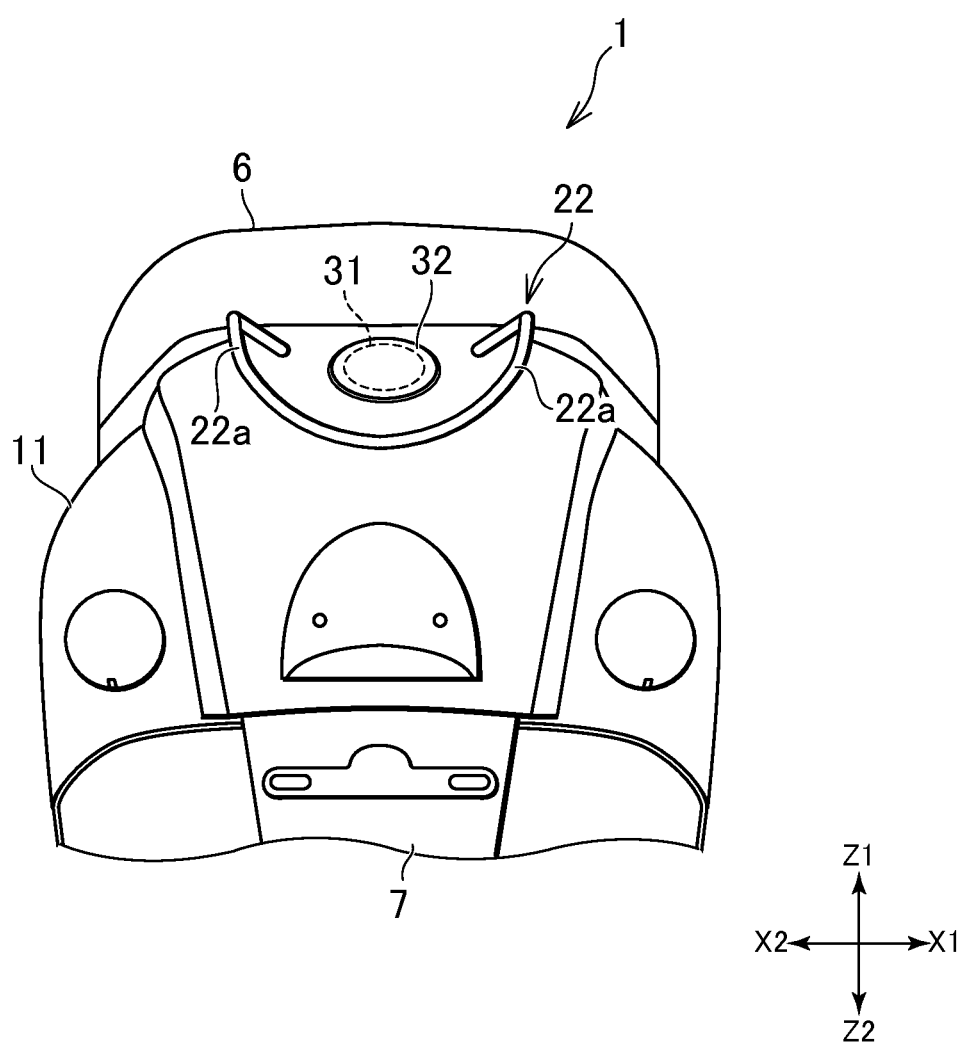
FIG. 2 is a rear view of a rear portion of the electric motorcycle shown in FIG. 1.
Figure 3:
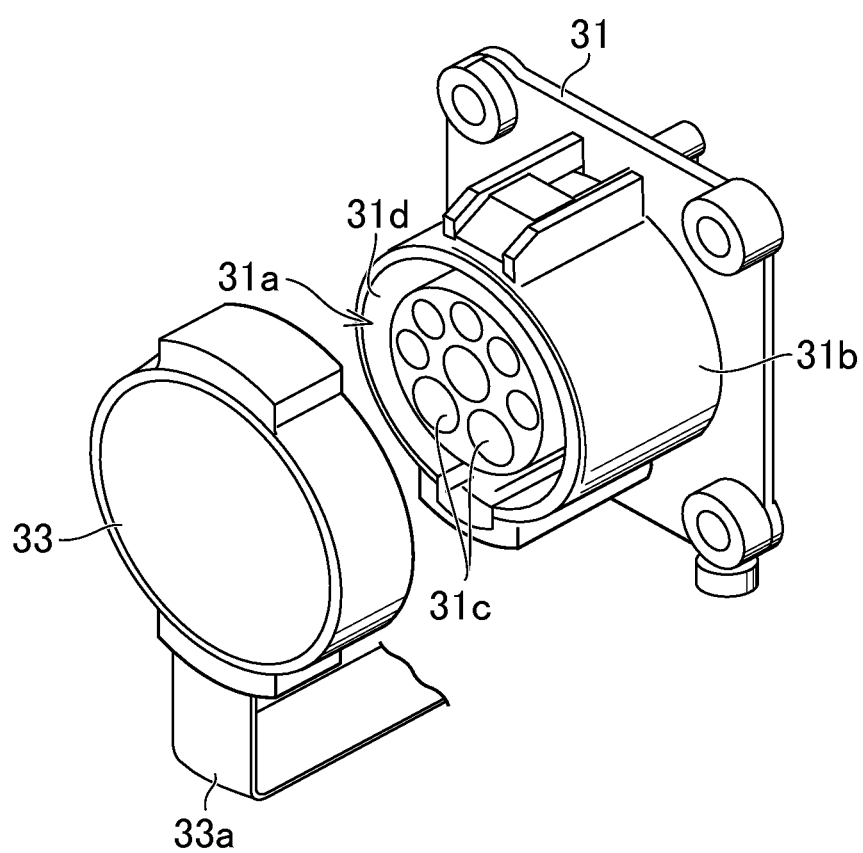
FIG. 3 is a perspective view of a power receiving connector.
Figure 4:
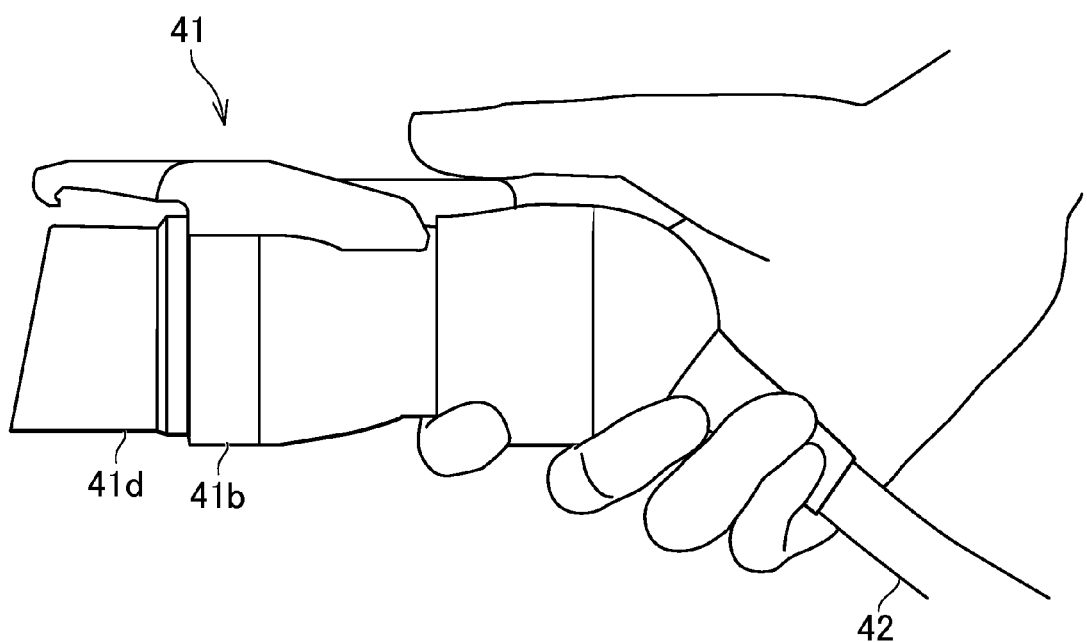
FIG. 4 is a side view of the power supply connector.

FIG. 1 is a side view of an electric motorcycle 1 according to the first preferred embodiment of the present invention. FIG. 2 is a rear view of a rear portion of the electric motorcycle 1. Y1 and Y2 in FIG. 1 show a forward direction and a backward direction, respectively, and Z1 and Z2 show an upward direction and a downward direction, respectively. X1 and X2 in FIG. 2 show a rightward direction and a leftward direction, respectively. X1-X2 show vehicle width directions. FIG. 3 is a perspective view showing an example of a power receiving connector 31. FIG. 4 is a side view showing an example of a power supply connector 41. The power supply connector 41 is provided on the end of a cable 42 extending from an external battery charger.

As shown in FIG. 1, the electric motorcycle 1 includes a front wheel 2 and a rear wheel 3. The front wheel 2 is supported at the lower end of a front-wheel suspension 4. A handle 5 is fixed to the upper end of the front-wheel suspension 4. Grips 5a are provided at the ends of the handle 5. The front-wheel suspension 4 is rotatable to the right and left about a steering shaft (not shown) supported at the front end of a vehicle body frame 21. A seat 6 is located rearward of the handle 5.

The electric motorcycle 1 includes an electric motor 10 configured to drive the rear wheel 3. Further, the electric motorcycle 1 includes a battery 8 that stores power supplied to the electric motor 10. The electric motor 10 is connected to the rear wheel 3 via a reduction mechanism including a gear, a belt, a pulley, etc. and the rear wheel 3 is driven by torque from the electric motor 10. In a preferred embodiment, the electric motor 10 and the reduction mechanism are housed in a case 9 as shown in FIG. 1. The case 9 is vertically swingable with the rear wheel 3. The layout of the electric motor 10 and the reduction mechanism may be appropriately changed. For example, the case housing the electric motor 10 and the reduction mechanism may be fixed to the vehicle body frame 21. The case housing the electric motor 10 and the reduction mechanism itself may function as a portion of the vehicle body frame. Alternatively, the electric motor 10 may be arranged within the wheel of the rear wheel 3. The position of the battery 8 is not particularly limited. For example, as shown in FIG. 1, the battery 8 is provided below the seat 6. The power output from the battery 8 is supplied to the electric motor 10 via, e.g., an inverter.

The electric motorcycle 1 includes the power receiving connector 31 electrically connected to the battery 8. In a preferred embodiment, the power receiving connector 31 is connected to the battery 8 via a cable. In another preferred embodiment, the power receiving connector 31 is provided in the battery 8 itself (for example, the power receiving connector 31 is fixed to the case of the battery 8). When an operator charges the battery 8, an external battery charger (not shown) is connected to the power receiving connector 31. Specifically, the power supply connector 41 is provided on the end of the cable 42 extending from the battery charger. The power supply connector 41 is connected to the power receiving connector 31 (see FIG. 1). In the example shown in FIGS. 1 and 2, the power receiving connector 31 is disposed inside of an exterior cover 11 defining an outer surface of the vehicle body and includes a connection port 31a (see FIG. 3) covered by an openable and closable connector cover 32 (see FIG. 2) and a cap 33 (see FIG. 3).

The electric motorcycle 1 includes a grasped portion 22 located and configured to be grasped by an operator when the operator connects the power supply connector 41 to the power receiving connector 31. The power receiving connector 31 is located near the grasped portion 22. That is, when the grasped portion 22 is provided in a front portion of the vehicle body, the power receiving connector 31 is also provided in the front portion of the vehicle body. Alternatively, when the grasped portion 22 is provided in a rear portion of the vehicle body, the power receiving connector 31 is also provided in the rear portion of the vehicle body. The grasped portion 22 is not covered by the exterior cover 11 and is exposed on the outside of the exterior cover 11.

In the example of FIGS. 1 and 2, both the power receiving connector 31 and the grasped portion 22 are provided in the rear portion of the vehicle body and located above the rear wheel 3. According to the above described layout, the positions of the power receiving connector 31 and the grasped portion 22 are relatively high and the operation of connecting the power supply connector 41 to the power receiving connector 31 is easily performed. For example, as shown in FIG. 1, both the power receiving connector 31 and the grasped portion 22 are located farther rearward than the seat 6 and farther forward than a rear fender 7 covering the rear wheel 3. The power receiving connector 31 in the example of FIG. 2 is located at the center in the vehicle width direction. The power receiving connector 31 may be located in a position offset to the right side or to the left side from the center in the vehicle width direction.

In the example of FIG. 1, the power receiving connector 31 includes a connection port 31a directed toward the rear side of the vehicle body. The power receiving connector 31 may include a connection port 31a directed directly backward or a connection port 31a directed obliquely backward and upward. When the connection port 31a of the power receiving connector 31 is directed toward the rear side of the vehicle body, the power receiving connector 31 and the power supply connector 41 are connected to each other in the front-back direction of the vehicle body. According to the above described layout of the power receiving connector 31, when the power supply connector 41 is connected to the power receiving connector 31, the power supply connector 41 does not project in a lateral direction of the vehicle body. Accordingly, the power supply connector 41 is not a hindrance during charging of the battery 8.

Figure 5:
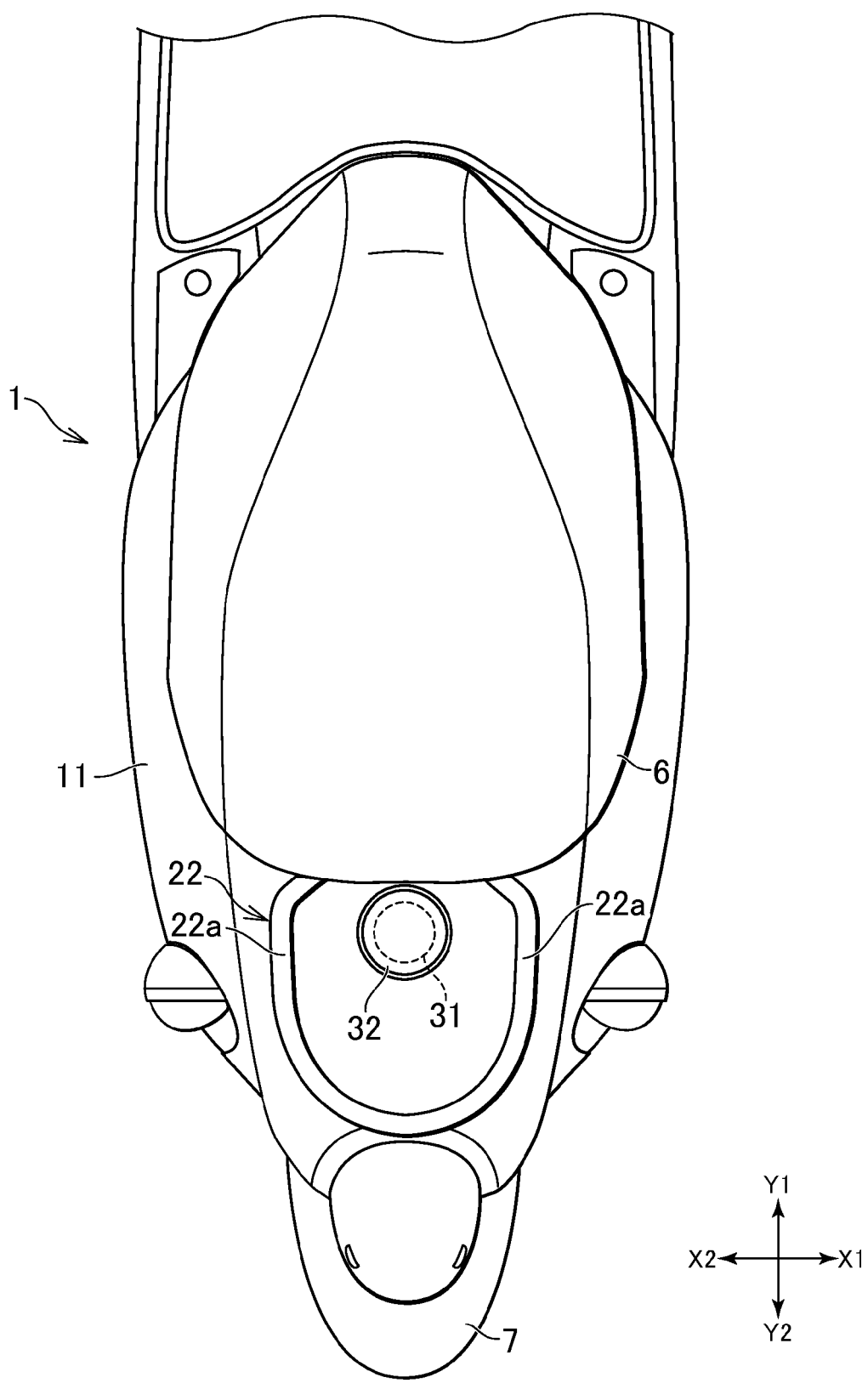
FIG. 5 is a plan view of the electric motorcycle shown in FIG. 1, including a modified example of a layout of the power receiving connector.

The orientation of the power receiving connector 31 is not limited to the example of FIGS. 1 and 2. FIG. 5 is a plan view of a rear portion of the electric motorcycle 1. As shown in the drawing, the power receiving connector 31 is directed upward from the vehicle body. In this case, the power receiving connector 31 and the power supply connector 41 are connected to each other in the vertical direction. In this case, when the power supply connector 41 is connected to the power receiving connector 31, the power supply connector 41 does not project in a lateral direction of the vehicle body. Accordingly, the power supply connector 41 is not a hindrance during charging of the battery 8. The power receiving connector 31 and the power supply connector 41 may be connected to each other in a direction tilted toward the front-back direction or tilted toward the vehicle width direction (the lateral direction) with respect to the vertical direction.

As described below, a direction in which the power supply connector 41 is connected to the power receiving connector 31 will be referred to as "connectors connection direction". When the connection port 31a of the power receiving connector 31 is viewed in the connectors connection direction, at least a portion of the grasped portion 22 is located from the power receiving connector 31 in a direction orthogonal or substantially orthogonal to the connectors connection direction. For example, in a vehicle in which the power supply connector 41 and the power receiving connector 31 are connected in the front-back direction of the vehicle body, when the connection port 31a of the power receiving connector 31 is viewed in the front-back direction, at least a portion of the grasped portion 22 is located in the upward, downward, or lateral direction from the power receiving connector 31. Alternatively, in a vehicle in which the power supply connector 41 and the power receiving connector 31 are connected in the vehicle width direction, when the connection port 31a of the power receiving connector 31 is viewed in the vehicle width direction, at least a portion of the grasped portion 22 is located in the upward, downward, forward, or backward direction from the power receiving connector 31. According to the above described layout, the operator easily grasps the grasped portion 22 by hand.

The grasped portion 22 in the example of FIG. 2 includes an extending portion 22a. The extending portion 22a preferably has a bar shape and, when the connection port 31a of the power receiving connector 31 is viewed in the connectors connection direction, extends in a direction orthogonal or substantially orthogonal to the connectors connection direction. Specifically, the extending portion 22a extends vertically. According to the above described shape of the grasped portion 22, the operator easily grasps the grasped portion 22 by hand. In the side view of the vehicle body, the extending portion 22a is arranged along the rear surface of the exterior cover 11.

When the connection port 31a of the power receiving connector 31 is viewed in the connectors connection direction, the extending portion 22a is located outward in the vehicle width direction from the power receiving connector 31. As described above, when the connection port 31a of the power receiving connector 31 is viewed in the connectors connection direction, the extending portion 22a extends vertically. That is, supposing that the direction in which the extending portion 22a is located from the power receiving connector 31 is defined as a second direction, the extending portion 22a extends in a third direction intersecting with both the connectors connection direction and the second direction.

As shown in FIG. 2, when the connection port 31a of the power receiving connector 31 is viewed in the connectors connection direction, the grasped portion 22 preferably surrounds the power receiving connector 31. When the grasped portion 22 has such a shape, the operator easily grasps the grasped portion 22, and unnecessary external forces acting on the power supply connector 41 are reduced or prevented when the power supply connector 41 is connected to the power receiving connector 31.

The grasped portion 22 in the example of FIG. 2 includes two extending portions 22a respectively located to the right and left of the power receiving connector 31. The operator may connect the power supply connector 41 to the power receiving connector 31 with the right hand while grasping the left extending portion 22a with the left hand. The two extending portions 22a include lower portions bent to be closer to each other and located downward from the power receiving connector 31. The two extending portions 22a are connected to each other to define an annular or substantially annular shape opening upward as a whole.

The shape of the extending portions 22a is not limited to the example shown in FIG. 2. For example, the two extending portions 22a are not necessarily connected to each other. Further, the grasped portion 22 does not necessarily include the two extending portions 22a. That is, the grasped portion 22 may include a single extending portion 22a. In this case, it is preferable that the extending portion 22a is located to the left of the power receiving connector 31. Thus, the operator may connect the power supply connector 41 to the power receiving connector 31 with the right hand while grasping the extending portion 22a with the left hand.

For example, the grasped portion 22 is fixed to the vehicle body frame 21. Thus, the grasped portion 22 is strongly supported. In the example of FIG. 1, the vehicle body frame 21 includes a rear frame portion 21a located below the seat 6 and extending in the front-back direction. For example, the grasped portion 22 is directly fixed to the rear frame portion 21a. The rear frame portion 21a is covered by the exterior cover 11 and the grasped portion 22 is located outside of the exterior cover 11. The supporting structure of the grasped portion 22 is not limited to that described above. For example, the grasped portion 22 may be fixed to the exterior cover 11.

At least a portion of the extending portion 22a of the grasped portion 22 is located farther away from the vehicle body than the power receiving connector 31 in the connectors connection direction. In the example of FIG. 1, the connection port 31a of the power receiving connector 31 is directed toward the rear side of the vehicle body and the power receiving connector 31 and the power supply connector 41 are connected to each other in the front-back direction. At least a portion of the extending portion 22a of the grasped portion 22 is located farther rearward than the power receiving connector 31. In the example of FIG. 1, the lower portion of the extending portion 22a is located farther rearward than the power receiving connector 31. As an example, the power supply connector 41 may have a cylindrical shape elongated in the connectors connection direction as shown in FIG. 4. According to the above described positional relationship between the grasped portion 22 and the power receiving connector 31, the hand grasping the grasped portion 22 is prevented from being spaced apart a large distance from the hand grasping the power supply connector 41 in the connectors connection direction when the operator connects the power supply connector 41 to the power receiving connector 31. Accordingly, the connection operation of the connectors 31, 41 is easily performed. The positional relationship between the grasped portion 22 and the power receiving connector 31 is not limited to those described above. For example, the extending portion 22a of the grasped portion 22 may be located in the same position in the connectors connection direction as that of the power receiving connector 31. According to the above described layout, the hand grasping the grasped portion 22 is prevented from being spaced apart a large distance from the hand grasping the power supply connector 41 in the connectors connection direction when the operator connects the power supply connector 41 to the power receiving connector 31.

As shown in FIG. 2, it is preferable that the connection port 31a of the power receiving connector 31 is covered by the connector cover 32 which defines a portion of the outer surface of the vehicle body. The exterior cover (the rear cover covering the rear portion of the vehicle body in the example of FIG. 2) 11 includes an opening in a position corresponding to the connection port 31a of the power receiving connector 31. The connector cover 32 closes the opening in the exterior cover 11. The connector cover 32 is detached and, thus, the power receiving connector 31 is exposed.

It is preferable that the connector cover 32 is configured so that its open state is maintained when opened. Thus, when the battery 8 is charged, it is not necessary for the operator to hold the connector cover 32 and the charging operation is easily performed. The connector cover 32 is connected to the exterior cover 11 via, e.g., a hinge or belt.

The power receiving connector 31 in the example of FIG. 3 includes the cap 33 detachable with respect to the connection port 31a of the power receiving connector 31. The cap 33 is configured so that external water or the like does not enter the connection port 31a. It is preferable that the cap 33 is configured so that its open state is maintained when opened. Thus, when the battery 8 is charged, it is not necessary for the operator to hold the cap and the charging operation is easily performed. The cap 33 is connected to a housing 31b of the power receiving connector 31 via, e.g., a belt 33a. Alternatively, the cap 33 may be connected to the housing 31b via a hinge.

As shown in FIG. 3, the power receiving connector 31 includes a housing 31b preferably made of resin, for example. The housing 31b includes a plurality of holes 31c therein and terminals are located inside the holes. In an example, two of the terminals are terminals to supply power and the other one is a terminal to transmit and receive control signals.

As shown in FIG. 4, the power supply connector 41 also includes a housing 41b preferably made of resin, for example. The housing 41b preferably has a cylindrical shape. The terminal of the power supply connector 41 is held by the housing 41b.

In the example of FIG. 3, an annular groove 31d is provided in the housing 31b of the power receiving connector 31. The housing 41b of the power supply connector 41 includes, in its end portion 41d, a tubular portion to be fitted in the groove 31d of the power receiving connector 31. In an example, when the end portion 41d of the housing 41b is inserted into the groove 31d of the power receiving connector 31 and when the end portion 41d of the housing 41b is pulled out from the groove 31d, friction resistances are generated. Further, a friction resistance is generated between the terminal of the power receiving connector 31 and the terminal of the power supply connector 41. Therefore, when connecting the power supply connector 41 to the power receiving connector 31 and pulling out the power supply connector 41 from the power receiving connector 31, it is necessary for the operator to apply a force exceeding the friction resistances. In the present preferred embodiment, the operator supports the vehicle body by grasping the grasped portion 22, and thus, even when the operator applies a force exceeding the friction resistances, instability of the attitude of the vehicle body is reduced or prevented.

As shown in FIG. 1, the electric motorcycle 1 includes a stand 15 to support the vehicle body when the vehicle is stopped. The stand 15 is moved around a shaft provided in the vehicle body between a standing position (the position of the stand 15 shown by dashed lines in FIG. 1) and a retracted position (the position of the stand 15 shown by solid lines in FIG. 1). In the standing position, the stand 15 extends downward from the shaft to support the vehicle body. In the retracted position, the stand 15 extends rearward from the shaft to allow traveling of the vehicle. When desiring to charge the battery 8 mounted on the vehicle body by an external battery charger, a passenger gets off the vehicle, and first places the stand 15 in the standing position to support the vehicle body by the stand 15. Then, the passenger performs the operation of connecting the power supply connector 41 to the power receiving connector 31. In this regard, the passenger performs the connecting operation of the connectors 41, 31 while grasping the grasped portion 22. As a result, even when the vehicle body is pushed by a force exceeding the insertion and pull-out resistance between the connectors in the connecting operation, the vehicle is prevented from being pushed forward, i.e., the stand 15 is prevented from rising to the retracted position by the force. As a result, stability of the vehicle in the connecting operation of the connectors 41, 31 is easily maintained.

Figure 6:
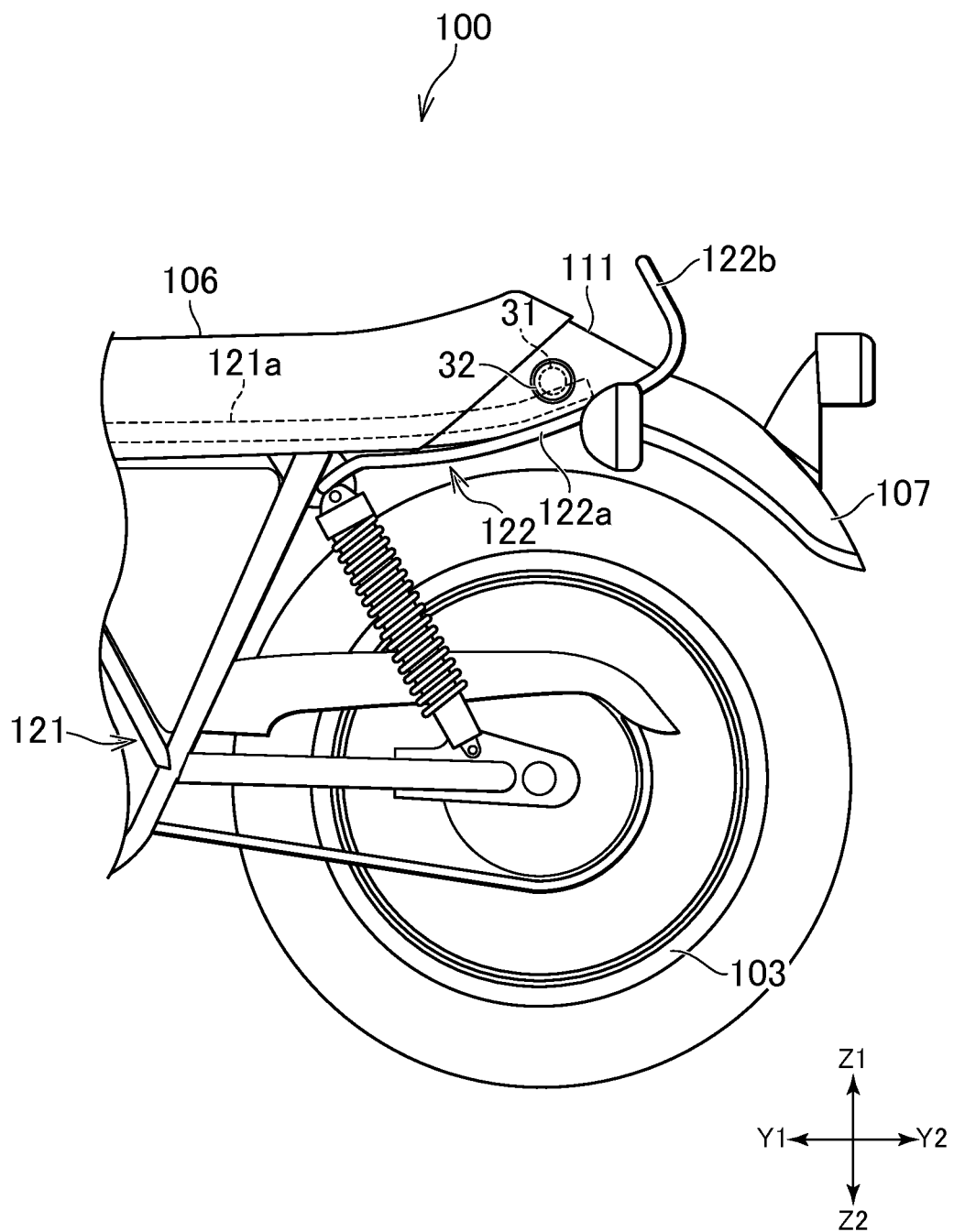
FIG. 6 is a side view of an electric motorcycle according to a second preferred embodiment of the present invention.
Figure 7:
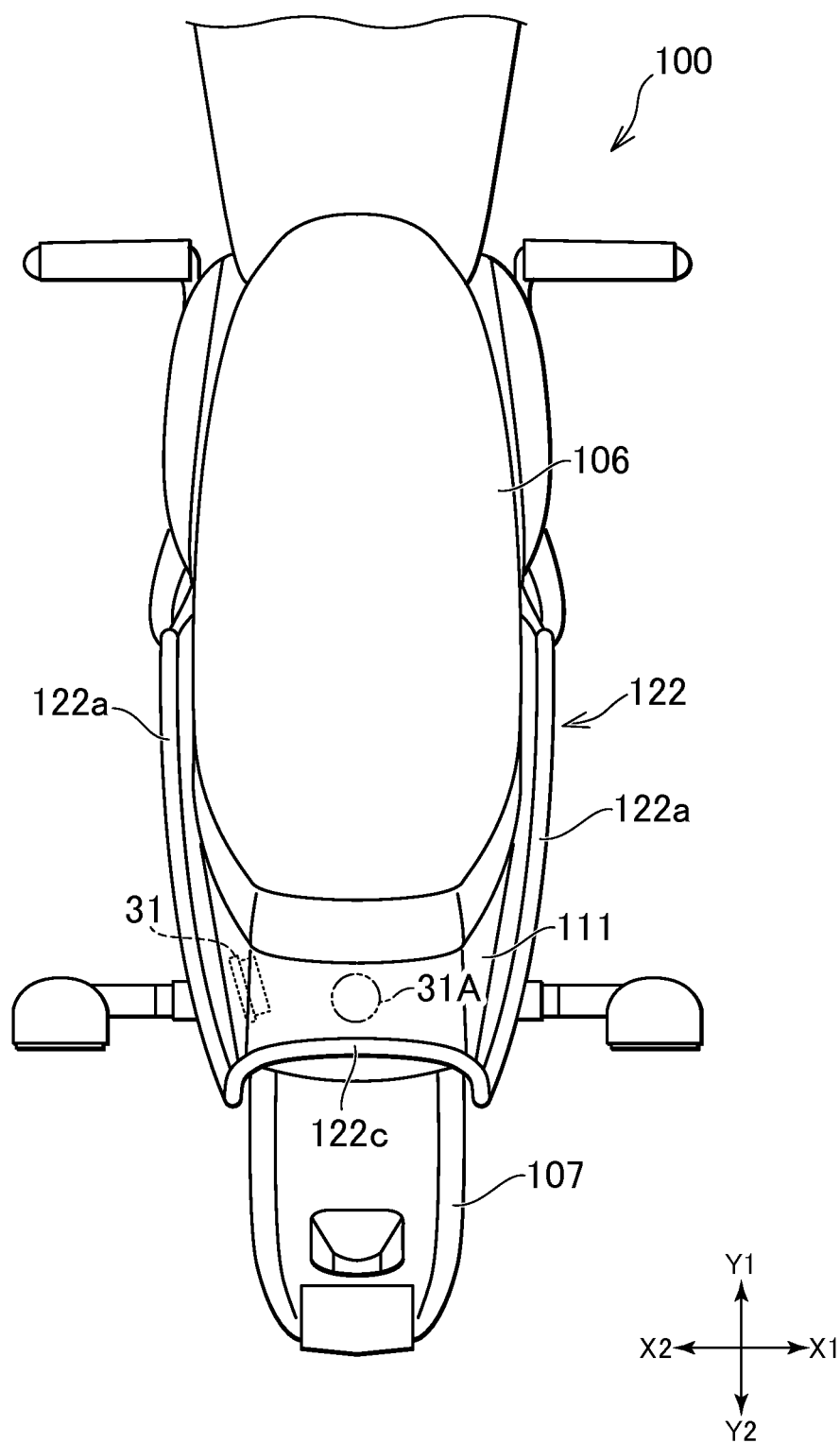
FIG. 7 is a plan view of the electric motorcycle shown in FIG. 6.
Figure 8:
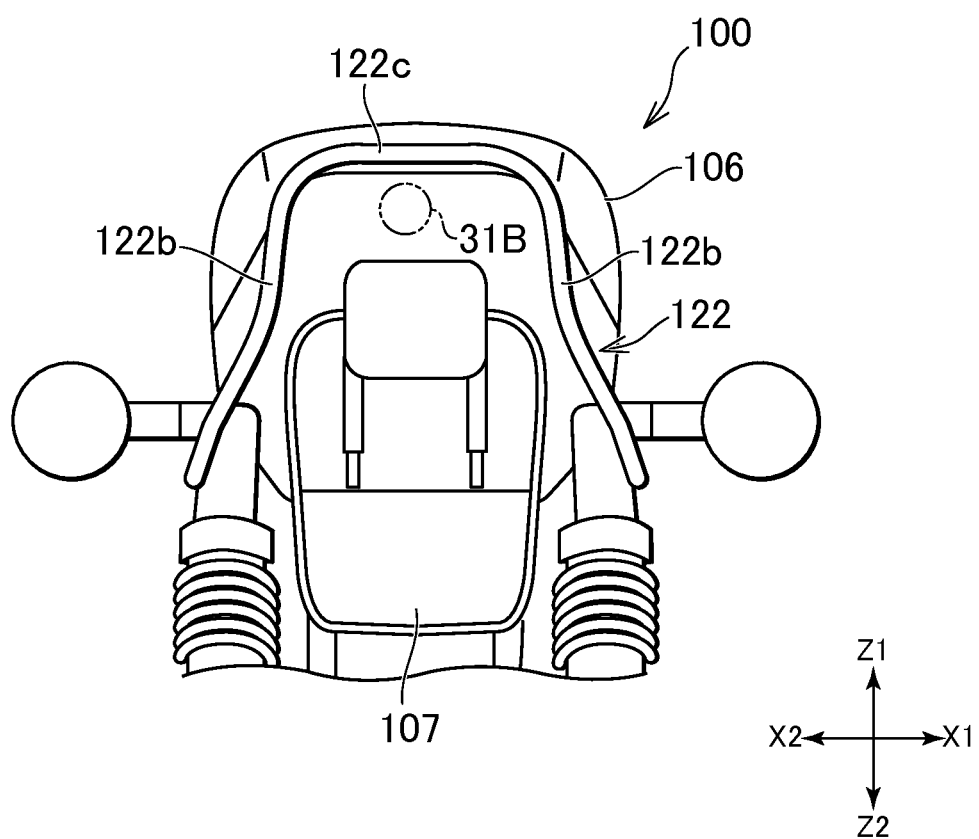
FIG. 8 is a rear view of a rear portion of the electric motorcycle shown in FIG. 6.

FIG. 6 is a side view of a rear portion of an electric motorcycle 100 according to a second preferred embodiment of the present invention. FIG. 7 is a plan view of the rear portion of the electric motorcycle 100. FIG. 8 is a rear view of the rear portion of the electric motorcycle 100. As described below, only the differences from the electric motorcycle 1 will be explained. The details not explained with respect to the electric motorcycle 100 are the same as those of the electric motorcycle 1.

The electric motorcycle 100 includes an electric motor and a battery similar to the electric motorcycle 1 (the electric motor and the battery are omitted in FIGS. 6 to 8). In an example, the electric motor and the battery are supported by a vehicle body frame 121.

The electric motorcycle 100 includes a seat 106 and a grasped portion 122. The electric motorcycle 100 includes a power receiving connector 31 near the grasped portion 122. Specifically, both the grasped portion 122 and the power receiving connector 31 are located above a rear wheel 103. Further, in a plan view of the vehicle body, a first extending portion 122a of the grasped portion 122 and the power receiving connector 31 are located in the same direction from the seat 106. In the electric motorcycle 100, the power receiving connector 31 is located to the left of the seat 106. The grasped portion 122 includes the first extending portion 122a located to the left of the seat 106.

The power receiving connector 31 in the example of FIG. 6 includes a connection port 31a directed outward in the vehicle width direction. In this case, the power supply connector 41 and the power receiving connector 31 are connected to each other in the vehicle width direction. The orientation of the connection port 31a may be tilted outward in the vehicle width direction and upward. In the example of FIGS. 6 to 8, the connection port 31a is directed toward the left side of the vehicle body. The power receiving connector 31 shown in FIG. 6 is located rearward of the seat 106 and located forward of a rear fender 107 covering the rear wheel 103 in the side view of the vehicle body. The layout of the power receiving connector 31 is not limited to that described above. The power receiving connector 31 may include a connection port 31a directed toward the rear side of the vehicle body as will be described below.

The power receiving connector 31 is located inside of the exterior cover 111. As shown in FIG. 6, the connection port 31a of the power receiving connector 31 is covered by a connector cover 32 defining a portion of the outer surface of the vehicle body. The connector cover 32 closes an opening in an exterior cover 111. Further, in the electric motorcycle 100, it is also preferable that the power receiving connector 31 includes a cap 33 that is detachable from the power receiving connector 31.

As shown in FIG. 6, the grasped portion 122 includes the first extending portion 122a, preferably having a bar shape, and extending in a direction orthogonal or substantially orthogonal to the connectors connection direction. When the connection port 31a of the power receiving connector 31 is viewed in the connectors connection direction, the first extending portion 122a is located from the power receiving connector 31 in a direction orthogonal or substantially orthogonal to the connectors connection direction. Specifically, the first extending portion 122a is located below the power receiving connector 31 and extends in the front-back direction. The first extending portion 122a is exposed to the outside of the exterior cover 111.

As shown in FIG. 7, the grasped portion 122 includes two first extending portions 122a which are respectively located to the right and left and to the rear end of the seat 106 in the plan view of the vehicle body. The respective two first extending portions 122a extend in the front-back direction. With the grasped portion 122, the passenger sitting on the rear portion of the seat 106 uses the grasped portion 122 as a grip to hold. In the example of FIG. 6, the front portions of the first extending portions 122a are located below the lower edge of the rear portion of the seat 106. The grasped portion 122 includes second extending portions 122b bent upward from the rear portion of the first extending portions 122a. Further, the grasped portion 122 includes a third extending portion 122c (see FIG. 8) above the right and left second extending portions 122b and extending in the vehicle width direction. The grasped portion 122 surrounds the rear portion of the seat 106 in the plan view of the vehicle body (see FIG. 7). The grasped portion 122 is not limited to that shown in FIGS. 6 to 8. For example, the first extending portion 122a and the second extending portion 122b on the right side and the first extending portion 122a and the second extending portion 122b on the left side are not necessarily connected to each other. Further, in FIG. 6, the first extending portions 122a are arranged below the power receiving connector 31, however, the first extending portions 122a may be located above the power receiving connector 31 in the side view of the vehicle body. In this case, the first extending portions 122a may be provided between the power receiving connector 31 and the rear end of the seat 106. Furthermore, as shown in FIG. 7, in an example, the third extending portion 122c is located rearward of the power receiving connector 31 in the plan view of the vehicle body. However, the position of the third extending portion 122c is not limited to that described above. For example, the third extending portion 122c may be provided above the power receiving connector 31.

As shown in FIG. 6, the front portions of the first extending portions 122a are located farther forward than the power receiving connector 31. Further, in the example of FIG. 6, the power receiving connector 31 includes the connection port 31a directed toward the left side of the vehicle body. Therefore, when the operator views the connection port 31a of the power receiving connector 31 in the connectors connection direction (vehicle width direction), the front portions of the first extending portions 122a are located to the left of the power receiving connector 31 (that is, the front portions of the first extending portions 122a are located toward the left hand of the operator). According to this positional relationship, the operator may connect the power supply connector 41 to the power receiving connector 31 with the right hand while grasping the front portion of the first extending portion 122a with the left hand.

The first extending portions 122a are located farther away from the vehicle body than the power receiving connector 31 in the connectors connection direction. Specifically, the first extending portions 122a are located farther outward than the power receiving connector 31 in the vehicle width direction. More specifically, the first extending portions 122a are located farther leftward than the power receiving connector 31. Thus, the hand grasping the first extending portion 122a is prevented from being spaced apart a large distance from the hand grasping the power supply connector 41 in the connectors connection direction when the operator connects the power supply connector 41 to the power receiving connector 31.

For example, the grasped portion 122 is fixed to the vehicle body frame 121. Thus, the grasped portion 122 is strongly supported. For example, as shown in FIG. 6, the vehicle body frame 121 includes a rear frame portion 121a located below the seat 106. The grasped portion 122 is fixed to the rear frame portion 121a. The power receiving connector 31 may also be fixed to the rear frame portion 121a. Alternatively, the power receiving connector 31 may be fixed to a support member fixed to the rear frame portion 121a.

In the electric motorcycle 100, the layout of the power receiving connector 31 is not limited to the example shown in FIG. 6. For example, the power receiving connector 31 may include a connection port 31a directed toward the rear side of the vehicle body as shown by a dashed-two dotted line 31B in FIG. 8. In this case, the power receiving connector 31 is located below the third extending portion 122c of the grasped portion 122. Further, in this case, when the connection port 31a is viewed in the connectors connection direction, the power receiving connector 31 is surrounded by the second extending portions 122b and the third extending portion 122c.

Alternatively, the power receiving connector 31 may be arranged such that the connection port 31a is directed upward from the vehicle body as shown by a dashed-two dotted line 31A in FIG. 7. In this case, the power receiving connector 31 is located forward of the third extending portion 122c of the grasped portion 122. Further, in this case, when the connection port 31a is viewed in the connectors connection direction, the power receiving connector 31 is surrounded by the first extending portions 122a and the third extending portion 122c.

Figure 9:
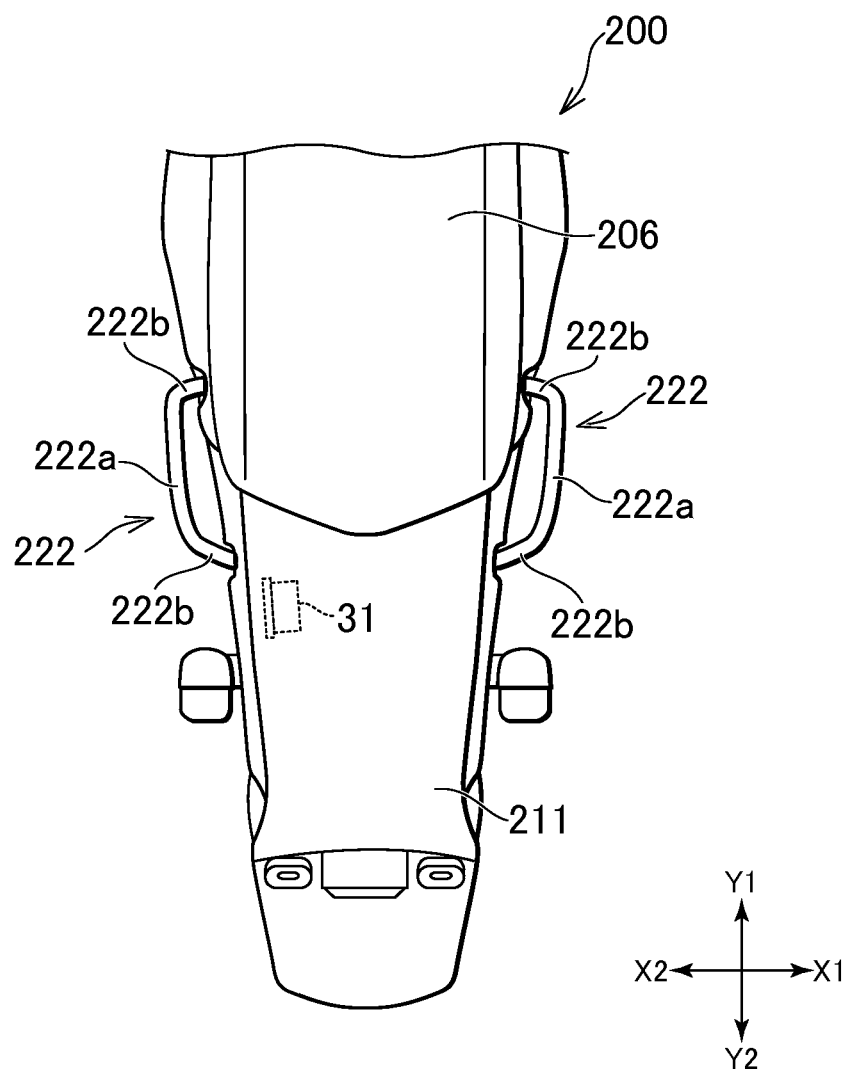
FIG. 9 is a plan view of an electric motorcycle according to a third preferred embodiment of the present invention.
Figure 10:
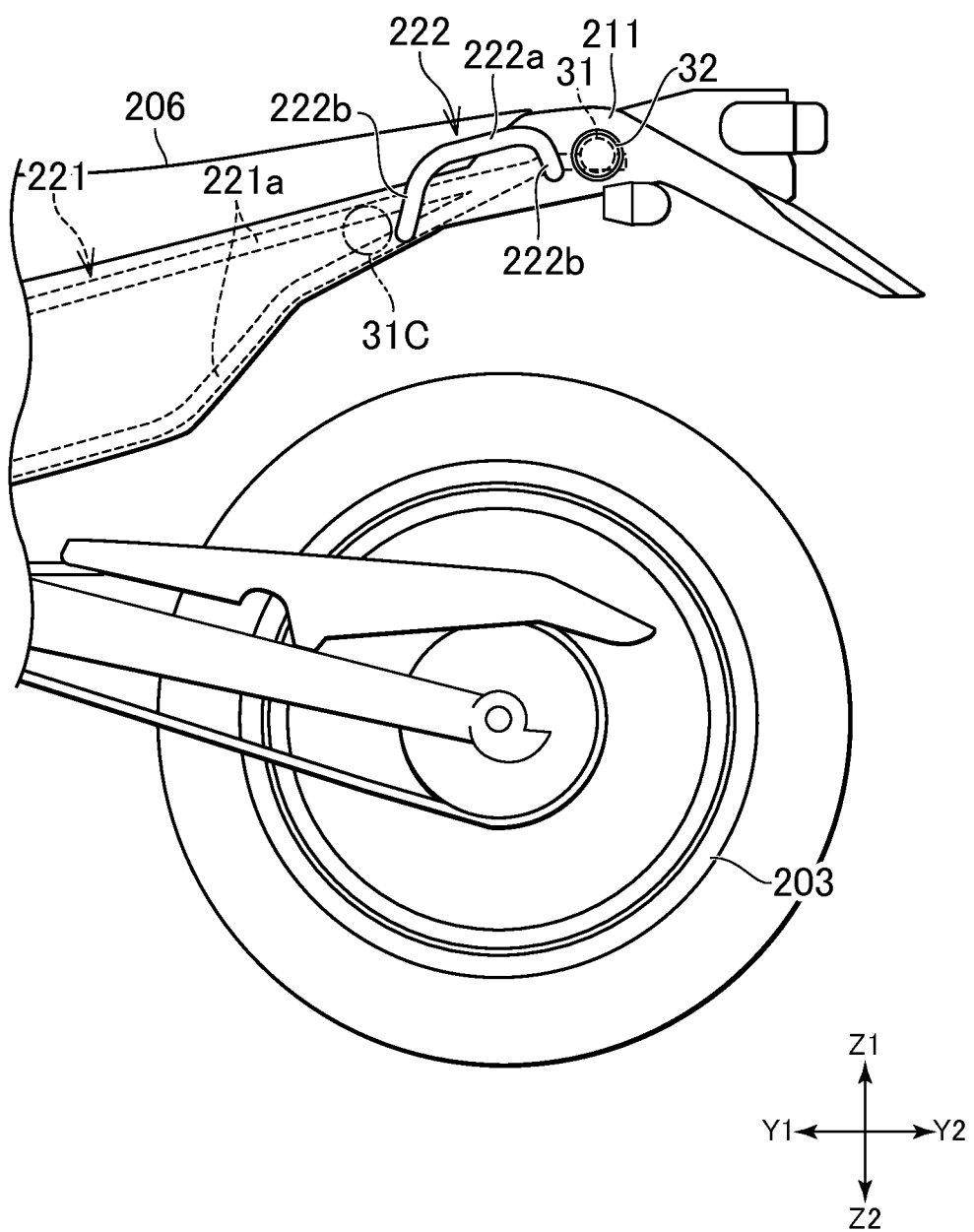
FIG. 10 is a side view of a rear portion of the electric motorcycle shown in FIG. 9.

FIG. 9 is a plan view of an electric motorcycle 200 according to a third preferred embodiment of the present invention. FIG. 10 is a side view of a rear portion of the electric motorcycle 200. As described below, only differences from the electric motorcycle 1 will be explained. The details not explained with respect to the electric motorcycle 200 are the same as those of the electric motorcycle 1.

The electric motorcycle 200 includes an electric motor and a battery similar to the electric motorcycle 1 (the electric motor and the battery are omitted in FIGS. 9 and 10). In an example, the electric motor and the battery are supported by a vehicle body frame 221.

The electric motorcycle 200 includes a seat 206 and a grasped portion 222. Further, the electric motorcycle 200 includes a power receiving connector 31 near the grasped portion 222. Specifically, both the grasped portion 222 and the power receiving connector 31 are located above a rear wheel 203. Furthermore, in a plan view of the vehicle body, the grasped portion 222 and the power receiving connector 31 are located in the same direction from the center of the seat 206. Specifically, in the electric motorcycle 200, the power receiving connector 31 is located rearward of the center of the seat 206 and outward in the vehicle width direction from the center of the seat 206 (in the example of FIG. 9, leftward from the center of the seat 206). The electric motorcycle 200 includes the grasped portion 222 located rearward of the center of the seat 206 and located outward in the vehicle width direction from the center of the seat 206 (in the example of FIG. 9, leftward from the center of the seat 206). The grasped portion 222 is located outside of an external cover 211 covering the rear portion of the vehicle body.

As shown in FIG. 9, the grasped portions 222 are respectively provided on the right side and the left side of the rear portion of the seat 206. According to the above described layout of the grasped portions 222, the grasped portions 222 are used as grips for a passenger sitting on the rear portion of the seat 206 to grasp. The electric motorbike 200 does not necessarily include the two grasped portions 222.

As shown in FIGS. 9 and 10, the power receiving connector 31 includes the connection port 31a directed outward in the vehicle width direction (specifically, leftward). Therefore, the power supply connector 41 and the power receiving connector 31 are connected to each other in the vehicle width direction of the vehicle body. When the connection port 31a of the power receiving connector 31 is viewed in the connectors connection direction, the grasped portions 222 are located in a direction orthogonal or substantially orthogonal to the connectors connection direction from the power receiving connector 31. Specifically, the entire grasped portions 222 are located forward of the power receiving connector 31. Accordingly, when the operator views the connection port 31a of the power receiving connector 31 in the connectors connection direction, the entire grasped portions 222 are located to the left of the power receiving connector 31 (the grasped portions 222 are located toward the left hand of the operator). According to this positional relationship, the operator connects the power supply connector 41 to the power receiving connector 31 with the right hand while grasping the grasped portion 222 with the left hand.

The positional relationship between the power receiving connector 31 and the grasped portion 222 is not limited to the example shown in FIG. 10. For example, as shown by a dashed-two dotted line 31C in FIG. 10, the power receiving connector 31 may be located forward of the grasped portion 222 in the side view of the vehicle body. Further, the grasped portion 222 may have an annular or substantially annular shape in the side view and the plan view of the vehicle body as will be described below. The power receiving connector 31 is preferably located inside of the grasped portion 222 in the side view of the vehicle body.

Alternatively, the power receiving connector 31 may be located rearward from the seat 206. In this case, the power receiving connector 31 may be located between the right and left grasped portions 222 and may be arranged such that the connection port 31a is directed upward from the vehicle body.

Also, in the electric motorcycle 200, the power receiving connector 31 is located inside of the exterior cover 211 and its connection port 31a is covered by a connector cover 32 defining a portion of the outer surface of the vehicle body.

The connector cover 32 closes an opening in the exterior cover 211. Further, in the electric motorcycle 200, it is also preferable that the power receiving connector 31 includes a cap 33 detachable from the power receiving connector 31 (see FIG. 3).

For example, the grasped portion 222 is fixed to the vehicle body frame 221. The vehicle body frame 221 of the example shown in FIG. 10 includes a rear frame portion 221a located below the seat 206. For example, the grasped portion 222 is fixed to the rear frame portion 221a. For example, the vehicle body frame 221 includes two rear frame portions 221a spaced from each other in the lateral direction. For example, the two grasped portions 222 are respectively connected to the two rear frame portions 221a. The power receiving connector 31 may also be fixed to the rear frame portion 221a.

As shown in FIG. 10, the grasped portion 222 includes a first extending portion 222a extending in a direction orthogonal or substantially orthogonal to the connectors connection direction (the front-back direction in this example). The operator supports the vehicle body by grasping the first extending portion 222a when connecting the power supply connector 41 to the power receiving connector 31.

The grasped portion 222 in the example of FIG. 10 includes two second extending portions 222b bent with respect to the first extending portion 222a. The two second extending portions 222b extend from the front end and the rear end of the first extending portion 222a toward the center in the vehicle width direction, respectively, and connected to the rear frame portion 221a. The shape of the grasped portion 222 is not limited to the example shown in FIG. 10. For example, the grasped portion 222 may include only one second extending portion 222b.

The first extending portion 222a of the grasped portion 222 is located farther away from the vehicle body than the power receiving connector 31 in the connectors connection direction (vehicle width direction). Specifically, the first extending portions 222a are located farther outward than the power receiving connector 31 in the vehicle width direction. More specifically, the first extending portions 122a of the left grasped portion 222 is located farther leftward than the power receiving connector 31. Thus, the hand grasping the grasped portion 222 is prevented from being spaced apart a large distance from the hand grasping the power supply connector 41 in the connectors connection direction.

Figure 11:
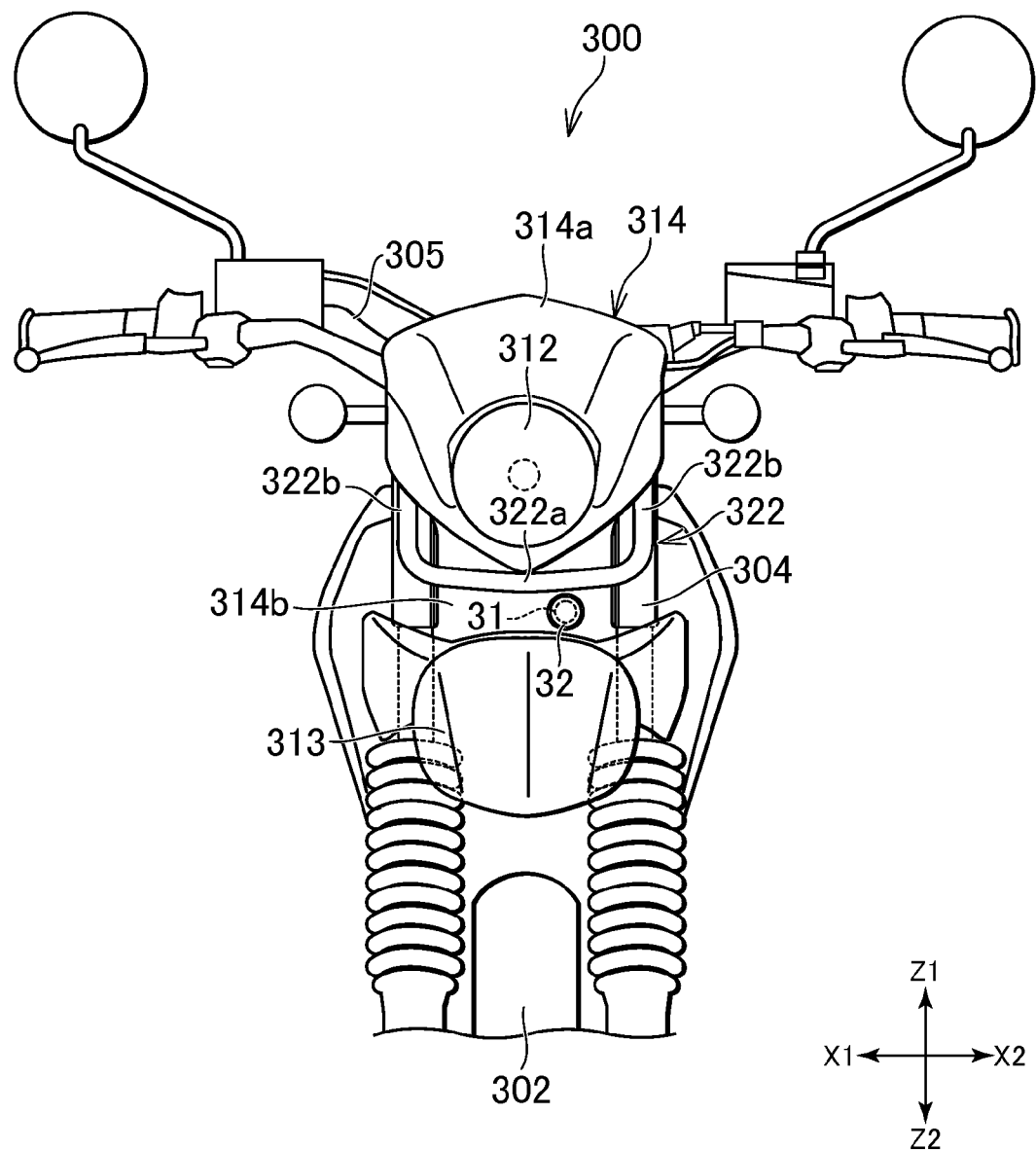
FIG. 11 is a front view of an electric motorcycle according to a fourth preferred embodiment of the present invention.
Figure 12:
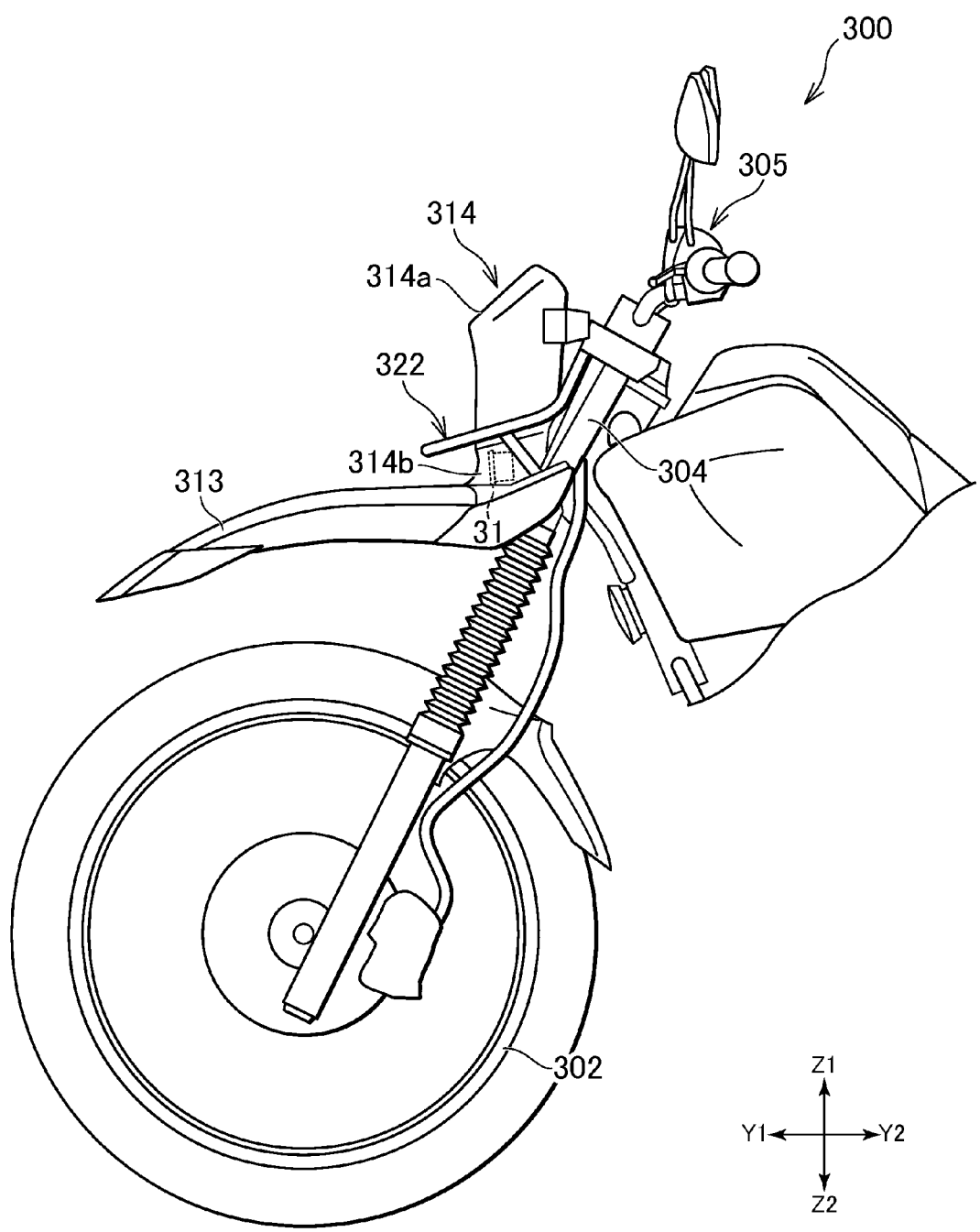
FIG. 12 is a side view of a front portion of the electric motorcycle shown in FIG. 11.

FIG. 11 is a front view of an electric motorcycle 300 according to a fourth preferred embodiment of the present invention. FIG. 12 is a side view of a front portion of the electric motorcycle 300. As described below, only differences from the electric motorcycle 1 will be explained. The details not explained with respect to the electric motorcycle 300 are the same as those of the electric motorcycle 1. The electric motorcycle 300 includes an electric motor and a battery similar to the electric motorcycle 1. In an example, the electric motor and the battery are supported by a vehicle body frame.

The electric motorcycle 300 includes a front-wheel suspension 304 in the front portion. The front-wheel suspension 304 supports a front wheel 302 at the lower end thereof. A handle 305 is fixed to the upper portion of the front-wheel suspension 304. The front-wheel suspension 304 is turnable to the right and left about a steering shaft.

The electric motorcycle 300 includes a power receiving connector 31 and a grasped portion 322 in the front portion of the vehicle body. For example, the power receiving connector 31 and the grasped portion 322 are supported by the front-wheel suspension 304. Thus, the power receiving connector 31 and the grasped portion 322 are turnable to the right and left together with the front-wheel suspension 304. As a result, when charging the battery, the handle 305 connected to the front-wheel suspension 304 is turned to the right or left, and thus, the orientation of the power receiving connector 31 is changed to a desired orientation. For example, the power receiving connector 31 is fixed to a support member fixed to the front-wheel suspension 304. For example, the grasped portion 322 is attached to the front-wheel suspension 304. Alternatively, the power receiving connector 31 and the grasped portion 322 may be fixed to a front cover 314 covering the front side of the vehicle body, which will be described below.

The attachment structure of the power receiving connector 31 is not limited to that described above. For example, in an electric motorcycle in which the front cover does not turn together with the front-wheel suspension, the power receiving connector 31 may be fixed to the front cover.

The power receiving connector 31 in the example of FIG. 11 includes the connection port 31a directed toward the front side of the vehicle body. The power receiving connector 31 and the power supply connector 41 are connected to each other in the front-back direction of the vehicle body. The connection port 31a of the power receiving connector 31 may be directed directly forward or obliquely forward and upward. According to the above described layout of the power receiving connector 31, when the power supply connector 41 is connected to the power receiving connector 31, the power supply connector 41 does not project in a lateral direction of the vehicle body. Accordingly, the power supply connector 41 is not a hindrance during charging of the battery.

The electric motorcycle 300 includes a headlight 312. The headlight 312 is supported by the front-wheel suspension 304 and is turnable to right and left together with the front-wheel suspension 304. In the example of FIGS. 11 and 12, the power receiving connector 31 is preferably located below the headlight 312. Further, the power receiving connector 31 is located above a front fender 313 covering the upper side of the front wheel 302 and supported by the front-wheel suspension 304.

The electric motorcycle 300 includes the front cover 314 that covers the front side of the vehicle body. The power receiving connector 31 is located inside of the front cover 314. An example of the front cover 314 includes a portion located between the headlight 312 and the front fender 313, and the power receiving connector 31 is located inside of the portion. In the example of FIGS. 11 and 12, a lower portion 314b of the front cover 314 is located between the headlight 312 and the front fender 313, and the power receiving connector 31 is located inside of the lower portion 314b. The front side and the right and left sides of the power receiving connector 31 are covered by the lower portion 314b. The lower portion 314b of the front cover 314 includes an opening located forward of the connection port 31a of the power receiving connector 31. The opening is closed by the above described connector cover 32. In the example of FIGS. 11 and 12, it is also preferable that a cap 33 is attached to the connection port 31a of the power receiving connector 31.

The front cover 314 in the example of FIG. 11 includes an opening in an upper portion 314a. The headlight 312 is arranged inside of the opening. The shape of the front cover 314 is not limited to the example of FIG. 11. For example, the front cover 314 does not necessarily include the upper portion with the opening for the headlight 312.

As shown in FIG. 11, the grasped portion 322 includes a first extending portion 322a. The first extending portion 322a preferably has a bar shape extending in the vehicle width direction. Further, the first extending portion 322a is located above the power receiving connector 31. That is, when the connection port 31a of the power receiving connector 31 is viewed in the connectors connection direction, the first extending portion 322a is located in a direction orthogonal or substantially orthogonal to the connectors connection direction from the power receiving connector 31. In the example of FIG. 11, the entire grasped portion 322 is located above the power receiving connector 31. The operator supports the vehicle body by grasping the first extending portion 322a when connecting the power supply connector 41 to the power receiving connector 31. The first extending portion 322a is located farther downward than the headlight 312.

The first extending portion 322a of the grasped portion 322 is located farther away from the vehicle body than the power receiving connector 31 in the connectors connection direction (the front-back direction in the example of FIG. 11). That is, the first extending portion 322a is located farther forward than the power receiving connector 31. Thus, when the power supply connector 41 is connected to the power receiving connector 31, the hand grasping the grasped portion 322 is prevented from being spaced apart by a large distance from the hand grasping the power supply connector 41. The first extending portion 322a is provided farther forward than the headlight 312.

The position of the power receiving connector 31 is shifted outward in the vehicle width direction from the center in the vehicle width direction. In the example of FIG. 11, the position of the power receiving connector 31 is shifted to the left (in the direction of X2) from the center in the vehicle width direction. Therefore, the first extending portion 322a is shifted to the right with respect to the power receiving connector 31. As a result, the operator connects the power supply connector 41 to the power receiving connector 31 with the right hand while grasping the first extending portion 322a with the left hand. The position of the power receiving connector 31 is not limited to the example shown in FIG. 11. For example, the power receiving connector 31 may be located at the center in the vehicle width direction.

As shown in FIG. 12, the grasped portion 322 includes a second extending portion 322b that is bent with respect to the first extending portion 322a. The second extending portion 322b is bent upward with respect to the first extending portion 322a and connected to the front-wheel suspension 304. The grasped portion 322 includes two second extending portions 322b respectively connected to ends of the first extending portion 322a. The grasped portion 322 surrounds the headlight 312 in the front view of the vehicle body. The shape of the grasped portion 322 is not limited to the example shown in FIG. 11. For example, the second extending portions 322b may extend from the ends of the first extending portion 322a directly rearward or extend from the ends of the first extending portion 322a obliquely rearward and downward and may be connected to the front-wheel suspension 304.

Figure 13:
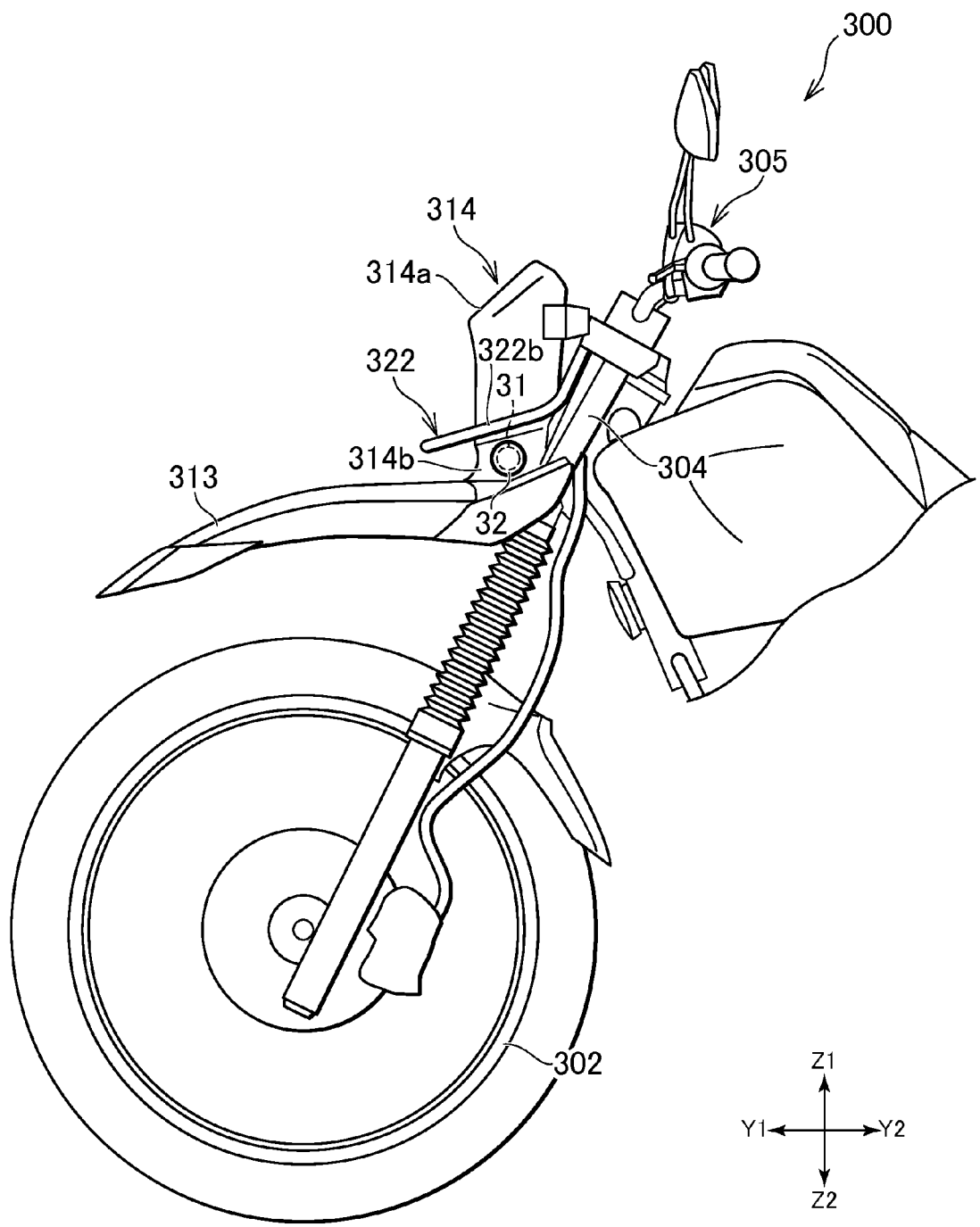
FIG. 13 is a side view showing a modified example of the electric motorcycle shown in FIG. 11.

In the electric motorcycle 300, the power receiving connector 31 may include the connection port 31a directed outward in the vehicle width direction. For example, as shown in FIG. 13, the power receiving connector 31 may be located inside of the lower portion 314b of the front cover 314 and arranged such that the connection port 31a is directed directly leftward or the connection port 31a is directed obliquely leftward and upward. The power supply connector 41 is connected to the power receiving connector 31 in the lateral direction of the vehicle body.

The power receiving connector 31 in FIG. 13 is located below the headlight 312 and above the front fender 313. In the example of FIG. 13, the second extending portion 322b of the grasped portion 322 is located above the power receiving connector 31 in the side view of the vehicle body. Therefore, the operator supports the vehicle body by grasping the second extending portion 322b when connecting the power supply connector 41 to the power receiving connector 31.

Figure 14:
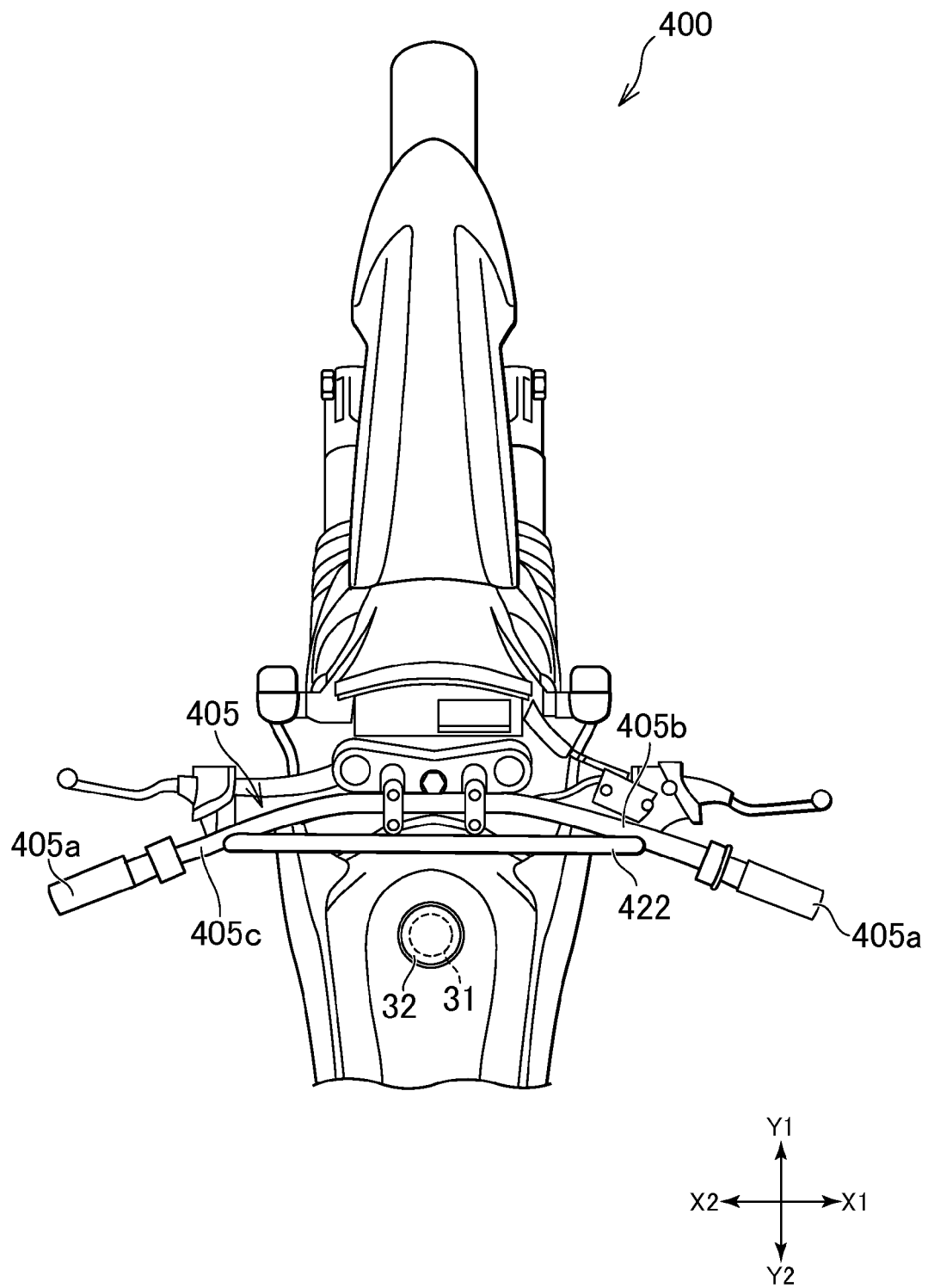
FIG. 14 is a plan view of an electric motorcycle according to a fifth preferred embodiment of the present invention.

FIG. 14 is a plan view of an electric motorcycle 400 according to a fifth preferred embodiment of the present invention. As described below, only differences from the electric motorcycle 1 will be explained. The details not explained with respect to the electric motorcycle 400 are the same as those of the electric motorcycle 100. The electric motorcycle 400 includes an electric motor and a battery similar to the electric motorcycle 1. In an example, the electric motor and the battery are supported by a vehicle body frame.

The electric motorcycle 400 includes a power receiving connector 31 and a grasped portion 422 which are located forward of the seat. In the electric motorcycle 400, the power receiving connector 31 includes the connection port 31a directed upward from the vehicle body. The connection port 31a may be directed obliquely upward and rearward or obliquely upward and forward.

The electric motorcycle 400 includes the grasped portion 422 in a position located forward of the power receiving connector 31 in the plan view of the vehicle body. The grasped portion 422 is provided on a handle 405. Specifically, the handle 405 includes a right portion 405b and a left portion 405c respectively including grips 405a. The grasped portion 422 preferably has a bar shape and bridges the right portion 405b and the left portion 405c to extend in the vehicle width direction (lateral direction). The operator may connect the power supply connector 41 to the power receiving connector 31 with the right hand while supporting the vehicle body by grasping the grasped portion 422 with the left hand. Further, rigidity of the handle 405 is increased due to the grasped portion 422.

It is preferable that the grasped portion 422 is located farther away from the vehicle body than the power receiving connector 31 in the connectors connection direction. In the example of FIG. 14, the connection port 31a of the power receiving connector 31 is directed upward from the vehicle body and thus the power supply connector 41 and the power receiving connector 31 are connected to each other in the vertical direction. Therefore, it is preferable that the grasped portion 422 is located farther upward than the power receiving connector 31.

The above described grasped portions 22 to 422 are preferably, e.g., metal pipes. However, the materials and shapes of the grasped portions 22 to 422 are not limited to those disclosed in the preferred embodiments. For example, the grasped portions 22 to 422 may be made by injection molding a resin containing reinforced glass fiber. The degree of freedom in the shapes of the grasped portions is increased by using injection molding. Accordingly, the sectional shapes of the bar-shaped extending portions of the grasped portions are not limited to circles or squares, but may be appropriately changed as long as the shapes can be grasped by hand like, for example, diamond shapes. Further, the lengths of the extending portions are not particularly limited. Furthermore, the bar-shaped extending portions are not limited to linear shapes, but may be curved in the middle.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A straddle-type electric vehicle comprising:
   a rear wheel;
   an electric motor configured to drive the rear wheel;
   a battery configured to store and supply power to the electric motor;
   a power receiving connector electrically connected to the battery and including a connection port to which a power supply connector is electrically connected in a first direction; and
   a grasped portion configured to be grasped by an operator, the grasped portion being located adjacent to the power receiving connector and including a portion extending in a second direction orthogonal or substantially orthogonal to the first direction from the power receiving connector when the connection port of the power receiving connector is viewed in the first direction; wherein
   the power receiving connector and the grasped portion are located above the rear wheel.

2. The straddle-type electric vehicle according to claim 1, wherein the portion of the grasped portion is located farther away from a vehicle body than the power receiving connector in the first direction.

3. The straddle-type electric vehicle according to claim 1, wherein the portion of the grasped portion is located in a same position in the first direction as the power receiving connector.

4. The straddle-type electric vehicle according to claim 1, wherein the portion of the grasped portion has a bar shape, and the bar shaped portion extends in a direction orthogonal or substantially orthogonal to the first direction when the connection port of the power receiving connector is viewed in the first direction.

5. The straddle-type electric vehicle according to claim 1, wherein the grasped portion includes a first extending portion extending in the second direction from the power receiving connector and a second extending portion that is bent with respect to the first extending portion.

6. The straddle-type electric vehicle according to claim 1, wherein the power receiving connector is surrounded by the grasped portion when the connection port of the power receiving connector is viewed in the first direction.

7. The straddle-type electric vehicle according to claim 1, wherein the grasped portion is fixed to a vehicle body frame.

8. The straddle-type electric vehicle according to claim 1, wherein the portion of the grasped portion is located farther leftward than the power receiving connector when the connection port of the power receiving connector is viewed in the first direction.

9. The straddle-type electric vehicle according to claim 1, further comprising a cap configured to close the connection port of the power receiving connector, and the cap is configured to maintain an open state when the cap is opened.

10. The straddle-type electric vehicle according to claim 1, wherein the connection port of the power receiving connector is directed toward a front side or a rear side of a vehicle body.

11. The straddle-type electric vehicle according to claim 1, wherein the connection port of the power receiving connector is directed outward in a vehicle width direction.

* * * * *